US006755488B2

(12) United States Patent
Fawkes et al.

(10) Patent No.: US 6,755,488 B2
(45) Date of Patent: Jun. 29, 2004

(54) TRACTION CONTROL SYSTEM

(75) Inventors: Paul Antony Fawkes, Coventry (GB); Simon Michael Dunning, Leamington Spa (GB)

(73) Assignee: Land Rover, Warwick (GB)

( * ) Notice: Subject to any disclaimer, the term of this patent is extended or adjusted under 35 U.S.C. 154(b) by 0 days.

(21) Appl. No.: 10/176,125

(22) Filed: Jun. 19, 2002

(65) Prior Publication Data
US 2002/0195873 A1 Dec. 26, 2002

(30) Foreign Application Priority Data
Jun. 20, 2001 (GB) .............................................. 0115032

(51) Int. Cl.$^7$ ................................................ B60T 8/24
(52) U.S. Cl. ....................... 303/139; 303/142; 303/112; 303/113.2; 701/71
(58) Field of Search ................................ 303/139, 142, 303/112, 151, 167, 168, 113.2, 70, 71, 84, 85, 20

(56) References Cited

U.S. PATENT DOCUMENTS

| | | | | |
|---|---|---|---|---|
| 3,981,545 A | * | 9/1976 | Eddy ........................... | 303/139 |
| 4,765,430 A | | 8/1988 | Schulze et al. ............. | 180/197 |
| 4,866,623 A | * | 9/1989 | Ise et al. ...................... | 701/85 |
| 5,010,974 A | * | 4/1991 | Matsuda ...................... | 701/69 |
| 5,018,595 A | * | 5/1991 | Hara et al. .................... | 701/70 |
| 5,103,399 A | * | 4/1992 | Iwata et al. ................... | 701/85 |
| 5,164,902 A | | 11/1992 | Kopper et al. ......... | 364/426.02 |
| 5,573,315 A | | 11/1996 | Schmitt et al. ............. | 303/141 |
| 5,597,215 A | | 1/1997 | Fischle et al. .............. | 303/139 |
| 6,321,154 B1 | | 11/2001 | Schmitt et al. .............. | 701/83 |
| 6,442,469 B1 | * | 8/2002 | Matsuno ...................... | 701/70 |

FOREIGN PATENT DOCUMENTS

| | | | | |
|---|---|---|---|---|
| DE | 36 35 095 A1 | 4/1987 | ........... | B60K/28/16 |
| DE | 40 11 974 C1 | 9/1991 | ........... | B60K/41/20 |
| DE | 198 37 521 A1 | 2/2000 | ........... | B60K/28/16 |
| JP | 04-293652 | 10/1992 | | |
| WO | 00/78584 A1 | 12/2000 | ........... | B60K/28/16 |

* cited by examiner

*Primary Examiner*—Jack Lavinder
*Assistant Examiner*—Melanie Torres
(74) *Attorney, Agent, or Firm*—Davis & Bujold, PLLC

(57) ABSTRACT

A vehicle brakes traction control system and method of operation, for a vehicle having a drive axle with a differential operable between wheels at the two ends of the axle, and brakes for each respective wheel operable by a brake controller. The traction control system includes wheel speed sensors sensing the rotational speed of the wheels, an engine torque demand sensor and an engine torque output monitor. The brake system controller receives signals from the wheel speed sensors, the engine torque demand sensor and the engine torque output monitor to apply the brakes to equalize the rotational speed of the wheels if the engine torque output is less than a desired torque output for a given torque demand.

11 Claims, 2 Drawing Sheets

TRACTION CONTROL SYSTEM

FIELD

This invention relates to traction control systems used on motor vehicles and which is an enhancement to brakes only traction control systems.

BACKGROUND OF THE INVENTION

Brakes traction control systems (BTCS) are typically used when driving off-road. BTCS in its most basic form acts as an electronically controlled variable slip differential lock for a drive axle on a vehicle in which torque is applied to wheels at opposite end of the axle via a conventional differential unit. The BTCS monitors the rotational speed of the wheels via wheel speed sensors and each wheel is provided with an independent braking actuator. The information from the sensors is fed to a brake system controller where the information is processed and the brakes to the wheels operated with the aim of improving traction.

If the vehicle is being driven on a non-homogenous surface and sufficient driving torque is applied it is possible for a wheel having a lower surface adhesion to loose grip and spin. In this situation, this wheel will require a relatively low torque, as compared with the other wheel, to cause it to "over spin". If the axle has a conventional differential, then the differential will permit only this same low torque to be transmitted to the non-spinning wheel. This level of torque may not be sufficient to maintain vehicle movement. The BTCS causes the brake actuator associated with the spinning wheel to apply the associated brake and increase its torque output in order to transfer torque across the differential to the non-spinning wheel. The non-spinning wheel then gains sufficient torque to achieve vehicle movement and its speed of rotation increases. The BTCS controls both wheels until their rotational speeds equalise.

A problem with this type of BTCS is that if the vehicle does not accelerate quickly, the brakes when applied to the spinning wheel may cause engine stall. Some BTCS are programmed to recognise engine stall and implement strategies to prevent this happening. This may leave the vehicle immobilised with the engine held in low revs and unable to supply the necessary torque to move the vehicle. Such a situation may be experienced with vehicles having small engines when driven off-road.

STATEMENTS OF INVENTION

According to the present invention there is provided a vehicle brakes traction control system for a vehicle having at least one drive axle with a differential operable between wheels at the two ends of the axle, and brakes for each respective wheel operable by a brake controller, the traction control system including wheel speed sensors which sense the rotational speed of said wheels, an engine torque demand sensor and an engine torque output monitor, the brake system controller receiving signals from said sensors and monitor and being operable to apply the brakes to equalise the rotational speed of said wheels when the engine torque output is less than a desired torque output for a given torque demand.

The torque demand sensor may be a throttle opening sensor such as an accelerator pedal position sensor, and the torque output monitor may include a torque output map.

The engine speed at which maximum torque output is targeted may be altered in relation to the rate of change of torque demand in particular so that the rate of torque build up at the wheels is proportional to the rate of change of torque demand. When the control system is for use in a vehicle having an engine management system (EMS) with an engine map stored therein which includes information relating to the engine speed at which the maximum torque is available for a given torque demand e.g. throttle opening, the brake system controller operates the vehicle brakes only when excess rotational speed is detected for one of said wheels and when in receipt of a signal from the EMS indicating that the engine speed is above that required for maximum torque output. Such a system is self tuning for any EMS.

Alternatively, the brakes controller has an engine map stored therein which includes information relating to the engine speed at which the maximum torque is available for given throttle openings, wherein the brake system controller operates the vehicle brakes when excess rotational speed is detected for one of said wheels and when the engine speed is above that required for maximum torque output.

The engine torque output may be measured as a function of rotational speed of the engine.

Also according to the present invention there is provided a method of operation of a vehicle brakes traction control system for a vehicle having at least one drive axle with a differential operable between wheels at the two ends of the axle, wherein the system is operable to apply the vehicle brakes to equalise the rotational speed of said wheels only when the engine torque output is less than a desired torque output for a given engine torque demand.

DESCRIPTION OF THE DRAWINGS

The invention will be described by way of example only and with reference to the accompanying drawings in which.

DETAILED DESCRIPTION OF THE INVENTION

Figure 1:
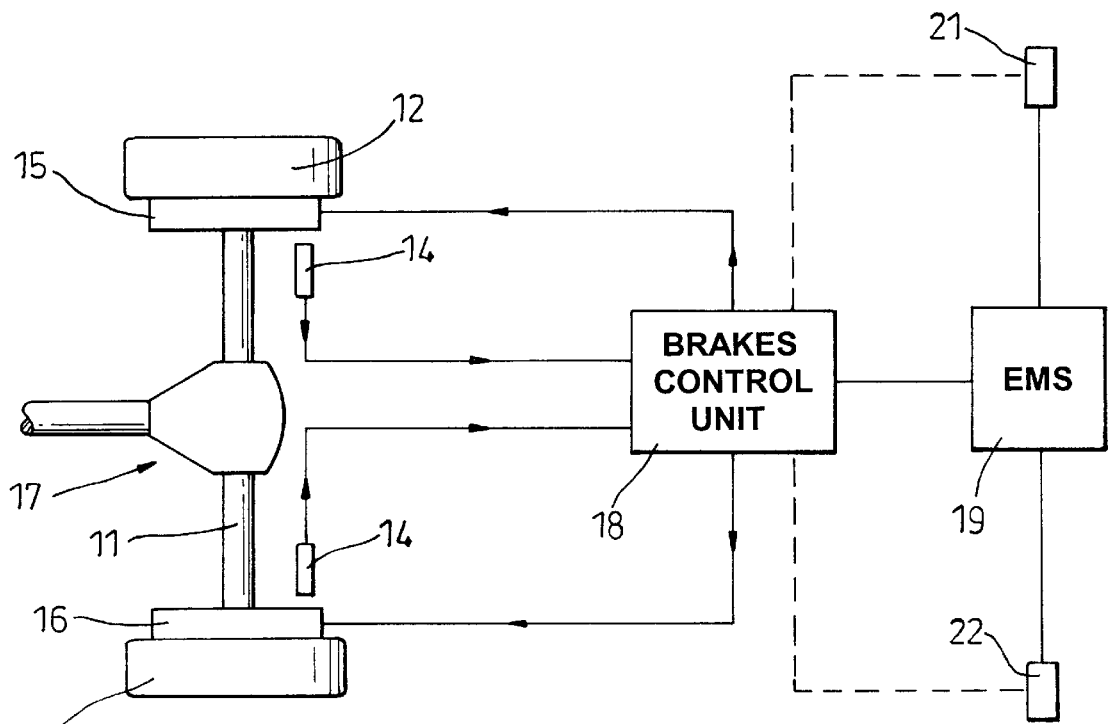
FIG. 1 is a schematic diagram of a traction control system according to the present invention.

With reference to FIG. 1 there is shown a vehicle drive axle 11 of a vehicle having a brake traction control system according to the present invention. The axle 11 has a wheel 12, 13 located at each end of the axle 11. The wheels 12 & 13 are driven via a differential gearing unit 17. The rotational speed of each wheel is monitored by a wheel speed sensor 14.

The vehicle has a braking system including a brake 15,16 associated with each wheel 12 & 13 respectively. The brakes 15 & 16 are operated through a brake system controller 18 which is connected to the vehicle engine management system (EMS) 19. The EMS is connected to a large number of sensors on the vehicle which monitor the condition of respective engine parameters.

The sensors include an engine torque demand sensor 21 which may sense for example the accelerator pedal position, or the position of the butterfly valve in the fuel intake, and an engine torque output sensor 22 which may read directly from the rotational speed of the engine flywheel, or some other suitable type of engine speed monitor, or may be deduced from an engine map.

The EMS 19 may be pre-programmed with an engine map which includes the information relating the engine rpm to the maximum torque available at given throttle demands. For the present purposes, the EMS 19 creates an engine speed message designated MD_Max which is an indication of the engine speed required to achieve maximum torque output in relation to the driver's torque demand i.e. accelerator pedal position. The EMS 19 also creates an engine speed message N_MOT and is operational so that a message passes to the brakes controller 19 to apply the brakes only when N_MOT>MD_MAX.

Provided that the messages MD_MAX and N_MOT are available the traction algorithm is self tuning for any EMS.

Figure 2:
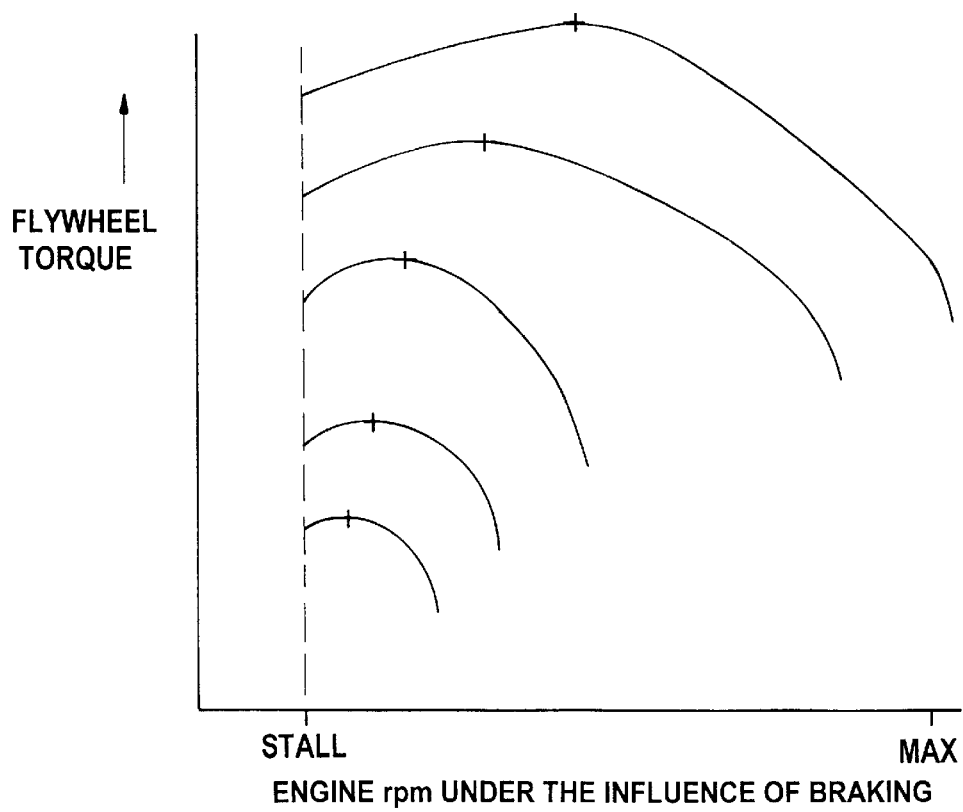
FIG. 2 is a graph showing a possible engine torque characteristic under braking at given throttle openings.

In order for a better understanding of the invention, reference is now made to FIG. 2 which illustrates possible torque curves for an engine under braking conditions. The different curves represent different throttle openings. For a given throttle opening, if an engine is braked its rpm (rotational speed) will reduce and its flywheel torque characteristic may change in a non-linear fashion. The precise characteristics will depend upon engine type and design, for example petrol or diesel type, whether boosted or normally aspirated, and engine fuel control strategy etc. The torque characteristics are used in the operation of the traction control system disclosed herein.

Figure 3:
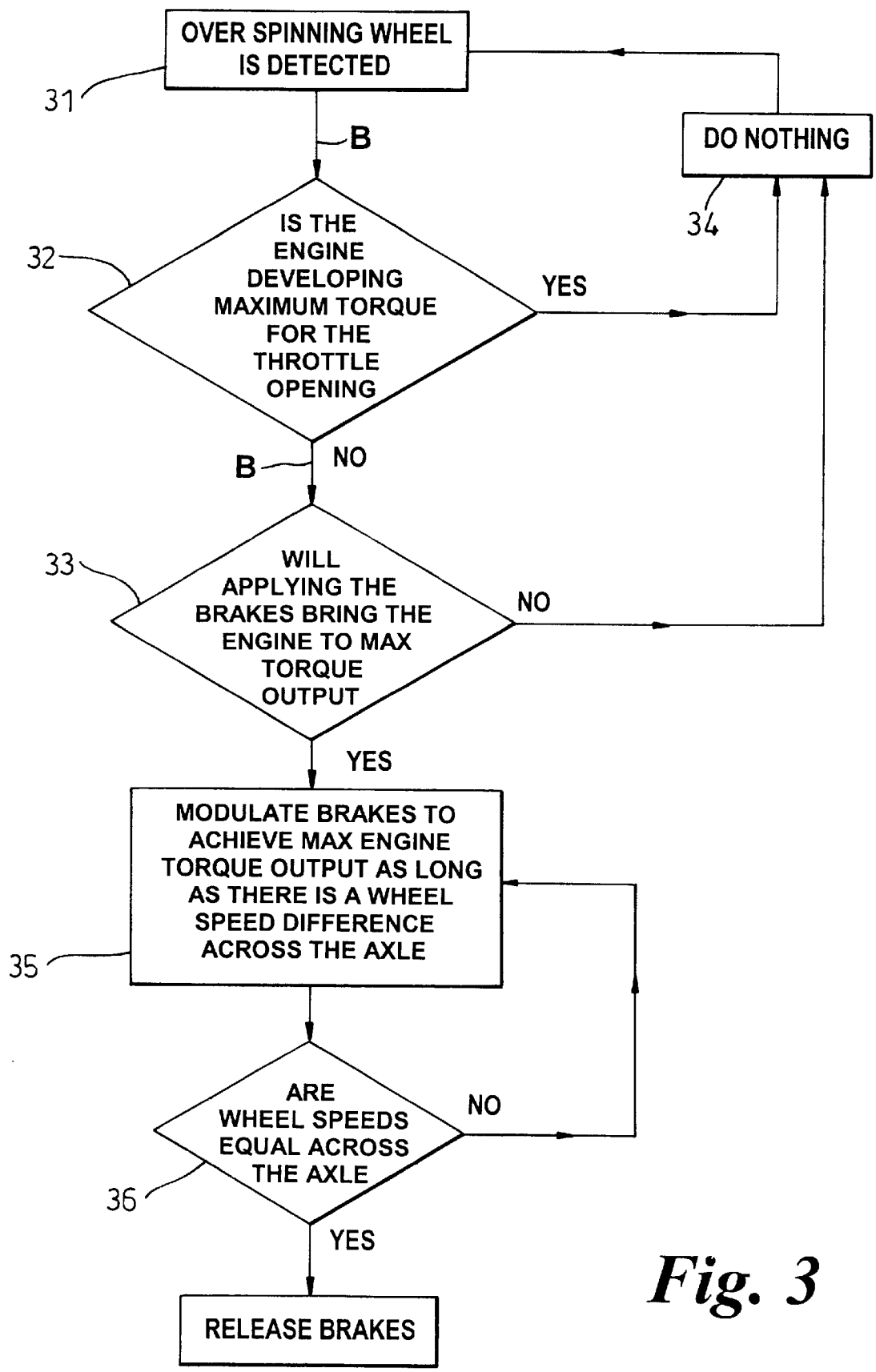
FIG. 3 is a logic system for the controller used in the system shown in FIG. 1.

The operation of the system will now be described with reference also to FIG. 3 which is a flow diagram for the operation of the brakes system controller 18.

Initially at step 31 the controller monitors the wheel speeds through sensors 14 and if the controller detects an over-spinning wheel then a signal B passes to step 32.

In step 32, when there is a spinning wheel, that is a low m wheel (m being the coefficient of friction) and a high m wheel, and the controller 18 is receiving a CAN message from the EMS 19 then the signal B passes to step 33. If no CAN message is detected, i.e. N_MOT£MD_MAX, then the signal B' is passed to step 34 and since there is no need for any brake intervention the controller 18 does not react. Hence if the engine is already delivering maximum torque for a given throttle setting there will be no brake intervention.

In step 33 the controller 18 assesses if brake intervention would modulate the brakes 15 or 16 to achieve N_MOT=MD_MAX. If yes then the signal B passes to step 35, if no the signal B" passes to step 34 and then brake intervention would not be permitted and the brakes controller does not react to modulate the brakes.

Hence maximum available engine torque is always transferred to the high m wheel. As the high m wheel gains speed the engine output is maintained at maximum torque by brake modulation of the low m wheel.

In step 35 the controller also assesses if there is a difference in speed across the axle as detected by the sensors 14. If so the controller modulates the brakes 14 and or 16. Hence maximum available engine torque is always transferred to the high m wheel. As the high m wheel gains speed the engine output is maintained at maximum torque by brake modulation of the low m wheel. As the low m wheel slows down, the high m wheel speed up with the engine torque output held a maximum for given driver (throttle) demand. This torque being supplied to the high m wheel.

In step 36 the wheel speeds are monitored and when the speed equalize the brake modulation is faded out and the brakes are released. Whilst the speeds differ significantly the signal is fed back to step 35 and the controller 18 continues to modulate the brakes.

In a variation the controller 18 may be connected directly to sensors 21 22, and the brakes controller 18 itself programmed with the engine map as described for the EMS 19.

In a further variation, for diesel engines and some petrol engines the torque output curve is flat rather than peaked. In this situation the maximum torque available at a particular throttle opening may not be specific but may extend over a range of engine rpm. In such cases it is preferable if the maximum torque output is related to the rate of change of the throttle opening. If the throttle is applied slowly the system can target maximum torque at low rpm, and if applied quickly the system could target maximum torque at high rpm. This should provide the driver with improved control over the speed of the vehicle response to the throttle when the traction control system is operated.

In such systems as described above the engine is less likely to stall than in conventional BTCS and in situations where the over-spinning wheel is delivering maximum torque for given driver demand (throttle opening) there will be no unnecessary brakes intervention making the operation of the vehicle more environmentally friendly.

What is claimed is:

1. A traction control system for a vehicle having at least one drive axle with a differential operable between wheels at each end of the axle, and brakes for each respective wheel operable by a brake system controller, the traction control system including wheel speed sensors which sense the rotational speed of said wheels, an engine torque demand sensor and an engine torque output monitor, the brake system controller receiving signals from said sensors and monitor when the engine torque output is less than the maximum torque output for a given torque demand the brake system controller is operable to apply the brakes to equalize the rotational speeds of the wheels to achieve said maximum torque output under the applied braking load.

2. A control system as claimed in claim 1 wherein, for a given torque demand, the engine speed at which maximum torque output is targeted may be altered in relation to the rate of change of torque demand.

3. A control system as claimed in claim 1 for use in a vehicle having an engine management system (EMS) with an engine map stored therein which includes information relating to the engine speed at which maximum torque is available for given throttle openings, wherein the brake system controller operates the vehicle brakes when excess rotational speed is detected for one of said wheels and when in receipt of a signal from the EMS indicating that the engine speed is above that required for maximum torque output.

4. A control system as claimed in claim 1, wherein the brakes system controller has an engine map stored therein which includes information relating to the engine speed at which maximum torque is available for given throttle openings and wherein the brake system controller operates the vehicle brakes when excess rotational speed is detected for one of said wheels and when the engine speed is above that required for maximum torque output.

5. A control system as claimed in claim 3, wherein the system is self tuning, having an engine map creating CAN signals MD_MAX and N_MOT, where N_MOT is a CAN message for engine speed and MD_MAX is the engine speed required for maximum torque output for a given torque demand, the brake system controller operating the vehicle brakes only when N_MOT>MD_MAX.

6. A control system as claimed in claim 4 wherein the system is self tuning, having an engine map creating CAN signals MD_MAX and N_MOT, where N_MOT is a CAN message for engine speed and MD_MAX is the engine speed required for maximum torque output for a given torque demand, the brake system controller operating the vehicle brakes only when N_MOT>MD_MAX.

7. A control system as claimed in claim 1, wherein the torque demand sensor is a throttle opening sensor.

8. A method of operation of a vehicle brakes traction control system for a vehicle having at least one drive axle with a differential operable between wheels at each end of the axle, brakes and wheel speed sensors for each respective wheel, wherein in said method the system is operable only when the engine torque output is less than the maximum torque output for a given throttle opening the brakes being applied to equalize the rotational speed of the wheels to achieve said maximum torque output under the applied braking load.

9. A method as claimed in claim 8 wherein, for a given torque demand, the engine speed at which maximum torque output is targeted is to be altered in relation to the rate of change of torque demand.

10. A method as claimed in claim 8 for use in a vehicle having an engine management system (EMS) with an engine map stored therein which includes information relating to the engine speed at which the maximum torque is available for given throttle openings, and wherein the brake system controller operates the vehicle brakes when excess rotational speed is detected for one of said wheels and when in receipt of a signal from the EMS indicating that the engine speed is above that required for maximum torque output.

11. A method as claimed in claim 10 wherein the system is self tuning, the engine map creating CAN signals MD_MAX and N_MOT where N_MOT is a CAN message for engine speed and MD_MAX is the engine speed required for maximum torque output for a given torque demand, the brakes being operational only when N_MOT>MD_MAX.

* * * * *